United States Patent
Nasu et al.

(10) Patent No.: US 6,846,416 B2
(45) Date of Patent: Jan. 25, 2005

(54) PROCESS FOR TREATING CHROMATE WASTE LIQUID

(75) Inventors: Hiroaki Nasu, Aichi (JP); Wataru Matsutani, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 62 days.

(21) Appl. No.: 09/916,532

(22) Filed: Jul. 30, 2001

(65) Prior Publication Data

US 2002/0033368 A1 Mar. 21, 2002

(30) Foreign Application Priority Data

Jul. 31, 2000 (JP) .......................................... 2000-232518

(51) Int. Cl.$^7$ ................................................ C02F 1/56
(52) U.S. Cl. ...................... 210/638; 210/639; 210/666; 210/667; 210/687; 210/725; 210/727; 210/734; 210/912; 210/913
(58) Field of Search ................................ 210/638, 639, 210/651, 652, 687, 712, 720, 724, 725, 727, 734, 737, 912, 913, 666, 667

(56) References Cited

U.S. PATENT DOCUMENTS

| | | | | |
|---|---|---|---|---|
| 3,575,853 A | * | 4/1971 | Gaughan et al. | 210/667 |
| 4,260,491 A | * | 4/1981 | Cassidy et al. | 210/720 |
| 4,338,200 A | * | 7/1982 | Zeijlstra | 210/724 |
| 4,419,246 A | * | 12/1983 | Jayawant | 210/721 |
| 4,705,639 A | * | 11/1987 | Aldrich | 210/720 |
| 4,802,993 A | * | 2/1989 | Katoh | 210/725 |
| 4,846,978 A | * | 7/1989 | Leggett et al. | 210/748 |
| 4,971,775 A | * | 11/1990 | Hoy et al. | 423/140 |
| 5,114,592 A | | 5/1992 | Schuster et al. | |
| 5,160,631 A | * | 11/1992 | Frost et al. | 210/720 |
| 5,330,658 A | * | 7/1994 | Grant et al. | 210/717 |
| 5,908,559 A | * | 6/1999 | Kreisler | 210/710 |
| 5,951,869 A | * | 9/1999 | Heskett | 210/638 |
| 6,607,651 B2 | * | 8/2003 | Stiller | 205/99 |

FOREIGN PATENT DOCUMENTS

| | | |
|---|---|---|
| DE | 196 38 176 A1 | 4/1998 |
| EP | 0 072 885 A1 | 3/1983 |
| JP | 52-68860 | 6/1977 |
| JP | 53-48086 | 5/1978 |
| JP | 55-18229 | 2/1980 |
| JP | 55-50467 | 4/1980 |
| WO | WO 93/16961 | 9/1993 |

OTHER PUBLICATIONS

Korean Office Action for Korean Patent Application No. 10–2001–0045821 dated Mar. 18, 2004.
European Search Report for EP 01 11 8162 dated Nov. 16, 2001.

* cited by examiner

Primary Examiner—Peter A. Hruskoci

(57) ABSTRACT

The invention relates to a process for treating a chromate waste liquid containing an organic acid component. This process includes (a) adding a chromium precipitation accelerating agent containing at least one of a calcium component and a magnesium component, to the chromate waste liquid; and (b) adjusting the chromate waste liquid to having a first pH of 9 or higher, thereby precipitating a chromium component from the chromate waste liquid and thereby reducing a concentration of a dissolved chromium component of the chromate waste liquid.

32 Claims, 7 Drawing Sheets

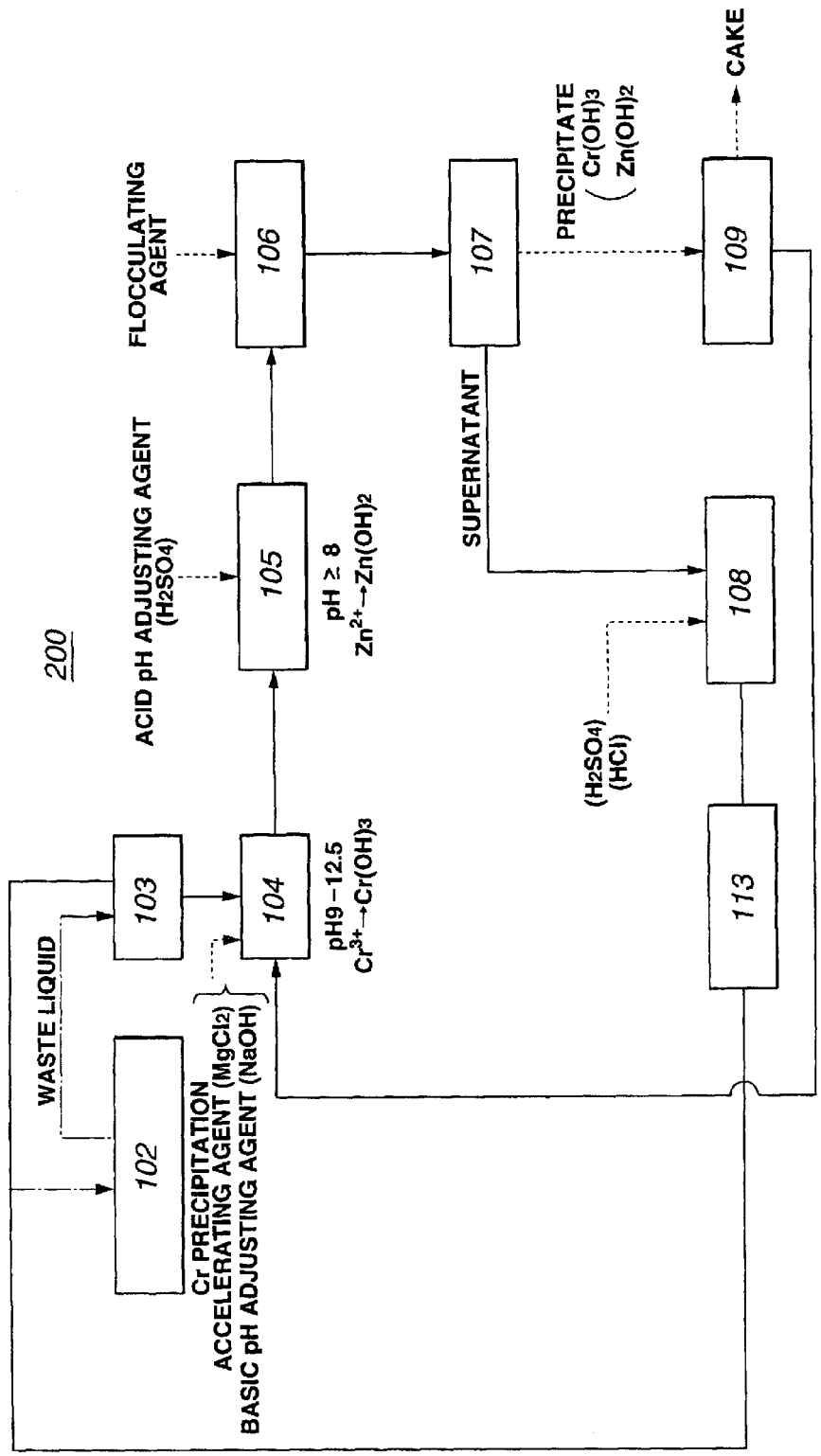

PROCESS FOR TREATING CHROMATE WASTE LIQUID

BACKGROUND OF THE INVENTION

The present invention relates to a process for treating a chromate waste liquid, which is produced in a chromate treatment line, and particularly to a process for removing a dissolved chromium component from the chromate waste liquid.

It is known to form an anticorrosive Zn or Sn plating layer on a surface of various iron-based parts such as metal bodies of spark plug and glow plug. Furthermore, a chromate film may be formed on such plating layer by a chromate treatment, when a higher anti-corrosiveness is required. For example, a zinc plating layer is able to provide an iron surface with superior anti-corrosiveness. It is, however, well known that such zinc plating layer tends corrode by a so-called sacrifice corrosion. The zinc oxide resulting from this corrosion has a white color, thereby making the external appearance inferior. Thus, it is often to cover the zinc plating layer with a chromate film in order to prevent corrosion of the plating layer.

Yellow chromate has widely been used for the chromate treatment, since it is good in anti-corrosiveness. A part of chromium component of yellow chromate, however, is in the form of hexavalent chromium. Therefore, it is a recent trend to avoid the use of such yellow chromate from the viewpoint of environmental protection. Since a yellow chromate treatment bath contains hexavalent chromium of a relatively high concentration, it is necessary to conduct a reducing treatment for reducing the hexavalent chromium to trivalent chromium. This increases the chromate treatment cost.

As an alternative chromate treatment, a chromate treatment with trivalent chromium, in place of hexavalent chromium, has been attracting much attention in recent years. German Patent Laid-open Publication DE 19638176 A1 discloses a process for forming a condensed, thick, trivalent chromium layer, using a trivalent chromium salt and a complexing agent containing an organic acid as its major component.

It is necessary to treat a chromate waste liquid such as (1) a waste liquid generated by washing a work after its chromate treatment and (2) a chromate treatment liquid that has reached its lifetime. In fact, it is necessary to remove a dissolved chromium component from such chromate waste liquid and then to discard the liquid as an effluent. It is known to conduct this removal by adding $Ca(OH)_2$ to a chromate waste liquid, thereby turning a dissolved chromium component into $Cr(OH)_3$ in the form of precipitate. However, in case that a chromate treatment liquid contains a large amount of an organic acid component (as a complexing agent or the like), as disclosed in the above-mentioned German Patent Publication, the chromate waste liquid also contains a large amount of the organic acid component. This organic acid component may be strongly bonded with chromium. Thus, it may be difficult to separate and remove such chromium component from the waste liquid.

SUMMARY OF THE INVENTION

It is therefore an object of the present invention to provide a process for treating a chromate waste liquid, which is able to effectively separate and remove a chromium component from the waste liquid with a reduced cost, even when the chromate waste liquid contains a large amount of an organic acid component.

According to the present invention, there is provided a process for treating a chromate waste liquid containing an organic acid component. This process comprises (a) adding a chromium precipitation accelerating agent comprising at least one of a calcium component and a magnesium component, to said chromate waste liquid; and (b) adjusting said chromate waste liquid to having a first pH of 9 or higher, thereby precipitating a chromium component from said chromate waste liquid and thereby reducing a concentration of a dissolved chromium component of said chromate waste liquid.

BRIEF DESCRIPTION OF THE DRAWINGS

FIG. 5 is a view similar to FIG. 3, but showing another exemplary chromate waste liquid treatment line;

DESCRIPTION OF THE PREFERRED EMBODIMENTS

Figure 1:
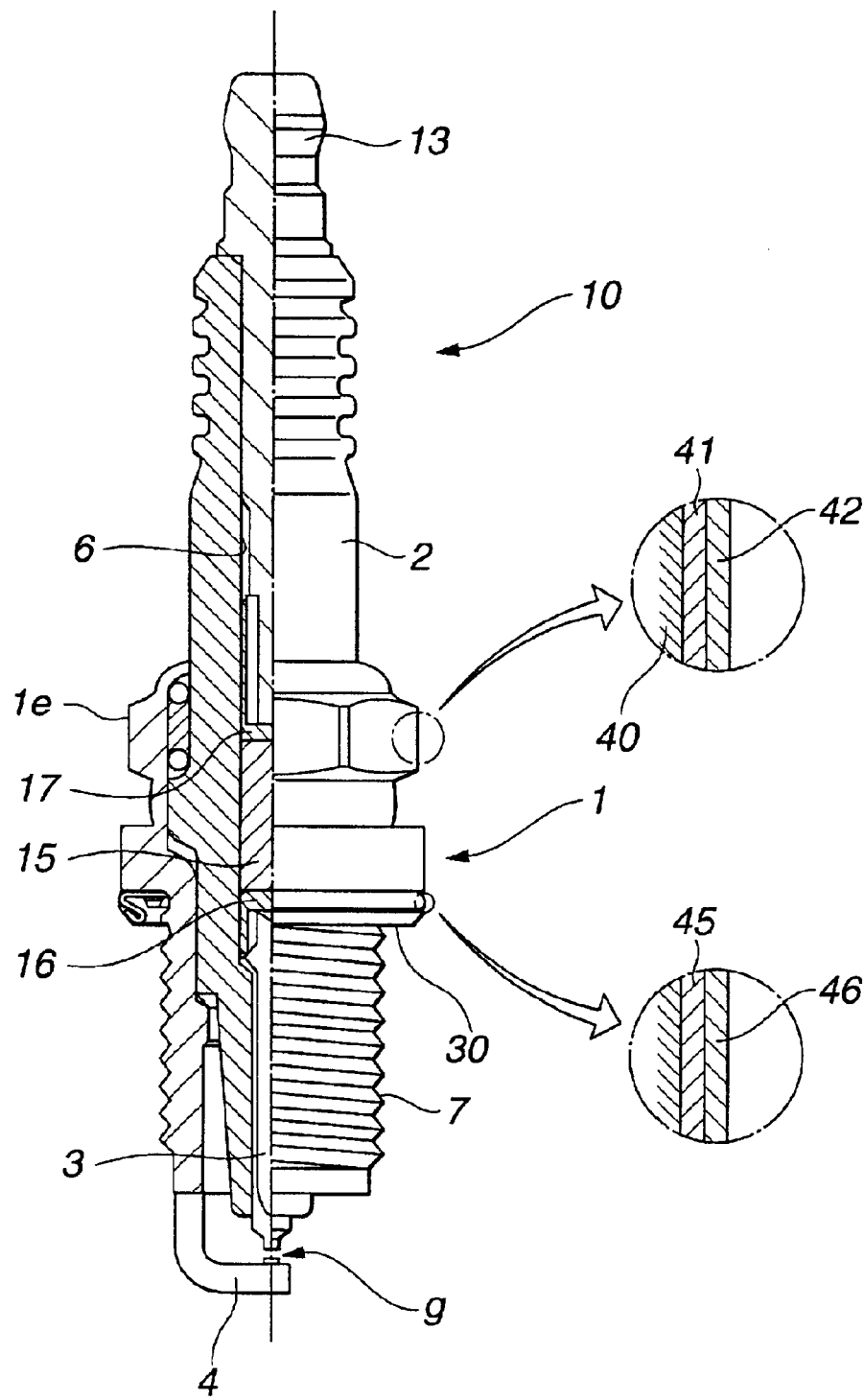
FIG. 1 is a half sectioned view of an exemplary spark plug that has been subjected to a chromate treatment.

It is possible to remove a dissolved chromium component from a chromate treatment waste liquid by adding a chromium precipitation accelerating agent (e.g., $Ca(OH)_2$) to the waste liquid, thereby turning the dissolved chromium component into a chromium-containing precipitate. In this removal, the pH value of the waste liquid has a great influence on the generation and the flocculation of the chromium-containing precipitate (hereinafter these generation and flocculation may be referred to as "chromium component precipitation"). Therefore, it is important to adjust and maintain the pH value to a proper value in order to smoothly proceed the chromium component precipitation. The inventors found that it is possible to smoothly proceed the chromium component precipitation at a pH of about 8 by adding a chromium precipitation accelerating agent to conventional chromate waste liquids (e.g., a waste liquid of a yellow chromate treatment). In contrast, we unexpectedly found that, when a chromate waste liquid contains a large amount of an organic acid component (e.g., complexing agent), it may not be possible to smoothly proceed the chromium component precipitation even if a considerable amount of a chromium precipitation accelerating agent is added. We assume the reason of this is that the chromium component precipitation is suppressed by a complex formed by a strong bonding between the organic acid component and chromium ions.

As a result of a further eager examination, we found that it becomes possible to smoothly proceed the chromium component precipitation, even in a chromate waste liquid containing a large amount of an organic acid component, by adjusting the pH of the waste liquid to 9 or higher, thereby effectively decreasing the dissolved chromium component concentration of the waste liquid.

If the target pH of the chromate waste liquid to be obtained by the pH adjustment is lower than 9, the rate of the chromium component precipitation becomes too low. Furthermore, the chromium component precipitate becomes too fine in size and thereby does not tend to flocculate. With this, it becomes difficult to separate and collect the precipitate. Thus, according to the invention, the target pH of the chromate waste liquid has a minimum value of 9, but does not have a particular maximum value. In theory, 14 is the maximum value. It is, however, preferable to set a suitable maximum value for the target pH in order that the amount of a pH adjusting additive may not become too much. In fact, the chromium precipitation accelerating agent can be used as the pH adjusting additive. Alternatively, it is optional to use a pH adjusting additive that is different from the chromium precipitation accelerating agent. Even if the target pH value is greater than, for example, 12.5, the chromium precipitation acceleration may not be improved further. Furthermore, it is necessary to use a considerably increased amount of the pH adjusting agent to maintain the target pH value at such high value. This makes the process uneconomical. In this specification, the term of "precipitate" is defined as containing a suspended matter of the waste liquid as well as a solid matter precipitated in the waste liquid.

The chromate waste liquid to be treated may include (1) a washing waste liquid generated by washing a work after its chromate treatment and (2) a chromate treatment liquid that has reached its lifetime. This washing waste liquid may have a dissolved chromium concentration of about 10–200 ppm, and this chromate treatment liquid may have a dissolved chromium concentration of about 8,000–12,000 ppm. It is easily possible by the invention to decrease the dissolved chromium concentration of these liquids to 2 ppm or lower.

The chromate waste liquid to be treated is not particularly limited, as long as it contains an organic acid component. A chromate treatment bath containing particularly a large amount of an organic acid, which is disclosed in German Patent Laid-open Publication DE 19638176 A1, can effectively be treated by the process of the invention. A chromate treatment liquid of this publication is used for forming a condensed, thick, chromate film (e.g., 0.2–0.5 µm in thickness) of trivalent chromium. It is difficult to form this film by other general chromate treatment processes. The mechanism of the formation of such chromate film is generally assumed as follows. At first, a base metal (e.g., zinc) is oxidized and dissolved in a chromate treatment liquid. Then, the dissolved base metal reacts with a solution containing chromate ions. With this, a complex (in the form of polymer) is formed by trivalent chromium through a bridge of hydroxyl group or oxygen. This complex precipitates or deposits in the form of gel on the base metal surface. In order to grow the chromate film, it is necessary to simultaneously have the base metal dissolution, the reaction between the dissolved base metal and the chromate ions in the bath, and the complex deposition. However, as the chromate film deposition proceeds to have a certain thickness, the base metal layer dissolution (a heterogeneous reaction) tends to be suppressed, thereby interrupting the chromate film growth. According to the above-mentioned German Patent publication, it is important to make the base metal dissolution greater and the rate of the film formation (due to the reaction between the dissolved base metal component and trivalent chromium) higher and to make the rate of redissolution of the deposited chromate film lower as much as possible. It is assumed to be possible to form a complex of trivalent chromium by adding a suitable complexing agent to the chromate treatment bath. With this, it is assumed that the film formation rate is accelerated to increase the chromate film thickness. The complexing agent may be selected from various chelating agents, that is, dicarboxylic acids, tricarboxylic acids, hydroxydicarboxylic acids and hydroxytricarboxylic acids, such as oxalic acid, malonic acid, succinic acid, glutaric acid, adipic acid, pimelic acid, cork acid, azelaic acid, sebacic acid, maleic acid, phthalic acid, terephthalic acid, tartaric acid, citric acid, malic acid, ascorbic acid, and mixtures of at least two of these. Furthermore, it can also be selected from other complexing agents, as described in the above-mentioned German Patent publication. A chromate treatment liquid that is prior to the chromate treatment may contain, for example, about 2–10 wt % of a complexing agent, and one that reached its lifetime may still contain about 2–10 wt % of the complexing agent. Furthermore, a washing waste liquid generated by washing a chromate treated work may also contain about 0.01–0.03 wt % of a complexing agent.

The chromium precipitation accelerating agent is preferably at least one of a calcium-containing inorganic compound and a magnesium-containing inorganic compound. Although this agent can be an organic compound, some organic compounds may be bonded as a complexing agent with chromium ions, thereby stabilizing chromium ions in the dissolved condition. This stabilization can be avoided by using an inorganic compound. The above-mentioned calcium-containing and magnesium-containing compounds are relatively low in price and superior in accelerating the reaction for generating a chromium component precipitate. The calcium-containing compound can be at least one selected from $Ca(OH)_2$, $CaCl_2$, and $Ca(NO_3)_2$. The magnesium-containing compound can be at least one selected from $MgCl_2$, $Mg(NO_3)_2$, and $MgSO_4$.

In case that, for example, $Ca(OH)_2$ is used as the chromium precipitation accelerating agent, this compound itself is a strong base. Therefore, the compound serves as this agent and at the same time serves to adjust the pH of the chromate waste liquid within a basic region. Consequently, it becomes possible to omit the addition of a basic pH adjusting agent, which is different from the chromium precipitation accelerating agent, to the chromate waste liquid, or to reduce the amount of the basic pH adjusting agent. This pH adjusting agent is used for adjusting the chromate waste liquid to have a first pH of 9 or higher. Furthermore, for example, $Ca(OH)_2$ can be used as the basic pH adjusting agent, too.

The chromium precipitation accelerating agent is preferably a substance having a high solubility in water in order to make the chromium precipitation rate higher. In connection with this, $CaCl_2$ and $MgCl_2$ can be used as this agent, since they have a high solubility in water and are low in price.

In case that $Ca(OH)_2$ is used as the chromium precipitation accelerating agent, its amount in terms of Ca is preferably about 50–1,000 mg per liter of the chromate waste liquid. If it is less than 50 mg, the chromium precipitation acceleration may become insufficient. If it is greater than 1,000 mg, it may not be possible to further significantly improve the chromium precipitation acceleration. This increases the treatment cost, too. In case that $CaCl_2$ is used as the agent, its amount in terms of Ca is preferably about 500–1,000 mg per liter of the chromate waste liquid by the same reason as above. In case that $MgCl_2$ is used as the agent, its amount in terms of Mg is preferably about 200–500 mg per liter of the chromate waste liquid by the same reason as above.

In case that, for example, $CaCl_2$ or $MgCl_2$, which is not a strong base, is used as the chromium precipitation accelerating agent, it is preferable to further add the above-mentioned basic pH adjusting agent in order to adjust the chromate waste liquid to having a first pH of 9 or higher. This pH adjusting agent is preferably a strongly basic compound having a high solubility in water and can be at least one compound selected from NaOH, KOH, LiOH and $Ca(OH)_2$. Of these, NaOH can preferably be used, since it is low in price and is capable of remarkably increasing the pH of the chromate waste liquid. It is, however, not preferable to add an excessive amount of NaOH, since it requires to use a large amount of a neutralizing agent for adjusting the pH of the waste liquid after the chromium component removal therefrom and increases the treatment cost. In case that $MgCl_2$ is used as the chromium precipitation accelerating agent, redissolution of the chromium component precipitate may occur by adding an excessive amount of NaOH. This may lower efficiency of the chromium separation and removal. Therefore, it is preferable to suitably set the amount of the basic pH adjusting agent in order to avoid the above-mentioned adverse effects.

Each of the chromium precipitation accelerating agent and the basic pH adjusting agent may be added in the form of solid or solution (e.g., aqueous solution). It is, however, preferably in the form of solution, when the reaction rate, the reaction uniformity, and the easiness for adjusting its amount are concerned. Furthermore, a compound (e.g., $Ca(OH)_2$) having a relatively low solubility in water may be added in the form of suspension.

The adjustment of the chromate waste liquid to have a first pH of 9 or higher and its maintenance at this pH can be conducted, while the chromate waste liquid is maintained at a temperature of 20° C. or higher. With this temperature maintenance, it is possible to considerably accelerate the precipitation of the chromium component. Therefore, the following advantageous effects can be obtained. Firstly, it is possible to lower the dissolved chromium component concentration with a short time, thereby remarkably improving the treatment efficiency. Secondly, it is possible to sufficiently lower the dissolved chromium component concentration even if the amount of the chromium precipitation accelerating agent is reduced by a certain degree. Consequently, it is possible to reduce the cost of the chromium precipitation accelerating agent. Furthermore, it is possible to reduce the cost for treating the chromium component precipitate (in the form of sludge) due to the reduction of the amount of this precipitate. The reason why the chromium component precipitation can be accelerated by the increase of the waste liquid temperature is assumed that the chelating strength of the complexing agent against chromium ions is weakened by the temperature increase and thereby chromium ions tend to flocculate.

It is preferable to maintain the chromate waste liquid at a temperature of 25° C. or higher, more preferably 30° C. or higher for conducting the above-mentioned pH adjustment and pH maintenance of the waste liquid. The chromium component precipitation efficiency is improved with a higher waste liquid temperature until about 60° C. Therefore, it becomes possible on the one hand to reduce the cost for treating the waste liquid. On the other hand, a higher waste liquid temperature increases the energy cost. Thus, it is preferable to adjust the waste liquid temperature to a suitable temperature in order to maximize the overall cost reduction of the waste liquid treatment. In fact, the cost reduction becomes more remarkable if the waste liquid is heated by a waste heat or the like. If the waste liquid temperature is 85° C. or higher, an excessive amount of a mist is generated by the evaporation of the waste liquid. Thus, it is necessary to provide an additional facility for collecting the mist. Therefore, it is preferable to maintain the chromate waste liquid at a temperature that is lower than 85° C.

In case that $Ca(OH)_2$ is used as the chromium precipitation accelerating agent, it is possible to greatly reduce the amount of this compound by increasing the waste liquid temperature. With this, it may not be possible to adjust the waste liquid to having a pH of 9 or higher by adding only $Ca(OH)_2$ since solubility of $Ca(OH)_2$ in water becomes smaller as the liquid temperature increases. In this case, it is preferable to adjust the waste liquid to having a pH of 9 or higher by adding a basic pH adjusting agent (e.g., NaOH, KOH and LiOH) other than $Ca(OH)_2$.

FIG. 1 shows a chromate treated spark plug 10. The spark plug 10 is formed with (1) a cylindrical metal body 1, (2) an insulator 2 partly inserted in the metal body 1, (3) a central electrode 3 that has an end portion projecting from the insulator 2, and (4) an earth electrode 4 that has one end attached to the metal body 1 and another end opposed to the end of the central electrode 3. There is a spark discharge gap g between the earth electrode 4 and the central electrode 3. The insulator 2 is a ceramic sintered body, for example, of alumina or aluminum nitride. A terminal metal 13 is inserted into one side of a through hole 6 of the insulator 2 and fixed to the insulator 2. The central electrode 3 is inserted into the other side of the through hole 6 and fixed to the insulator 2. A resistor 15 is disposed in the through hole 6 at a position between the terminal metal 13 and the central electrode 3. This resistor 15 is electrically connected at its both ends with the central electrode 3 and the terminal metal 13 with an interposal of conductive glass sealing layers 16, 17 therebetween. The cylindrical metal body 1, which is made of carbon steel or the like, forms a housing of the spark plug 10 and has at its peripheral surface a threaded portion 7 for fixing the spark plug 10 to an engine block (not shown). Designated by a symbol of 1e is a hexagonal portion to be engaged with a spanner, wrench or the like when the metal body 1 is fixed to an engine block. A gasket 30, which is a ring like member produced by bending a metal plate of carbon steel or the like, is fixed to a base end portion of the threaded portion 7 of the metal body 1. For providing anticorrosion, an entire surface of a base layer 40 (made of, for example, carbon steel) is coated with a zinc plating layer 41 and a chromate film 42. Similarly, the gasket 30 is coated with a zinc plating layer 45 and a chromate film 46.

The zinc plating layer 41 can be formed by a conventional electrolytic zinc plating method, and has a thickness, for example, of about 3–10 $\mu$m. The chromate film 42 may have a thickness of 0.2–0.5 $\mu$m and may be characterized in that at least 95 wt % of the chromium component of this film is trivalent chromium. Furthermore, the trivalent chromium content of the chromium component is preferably as high as possible. It is more preferable that substantially all of the chromium component of the film are in the form of trivalent chromium.

Figure 2:
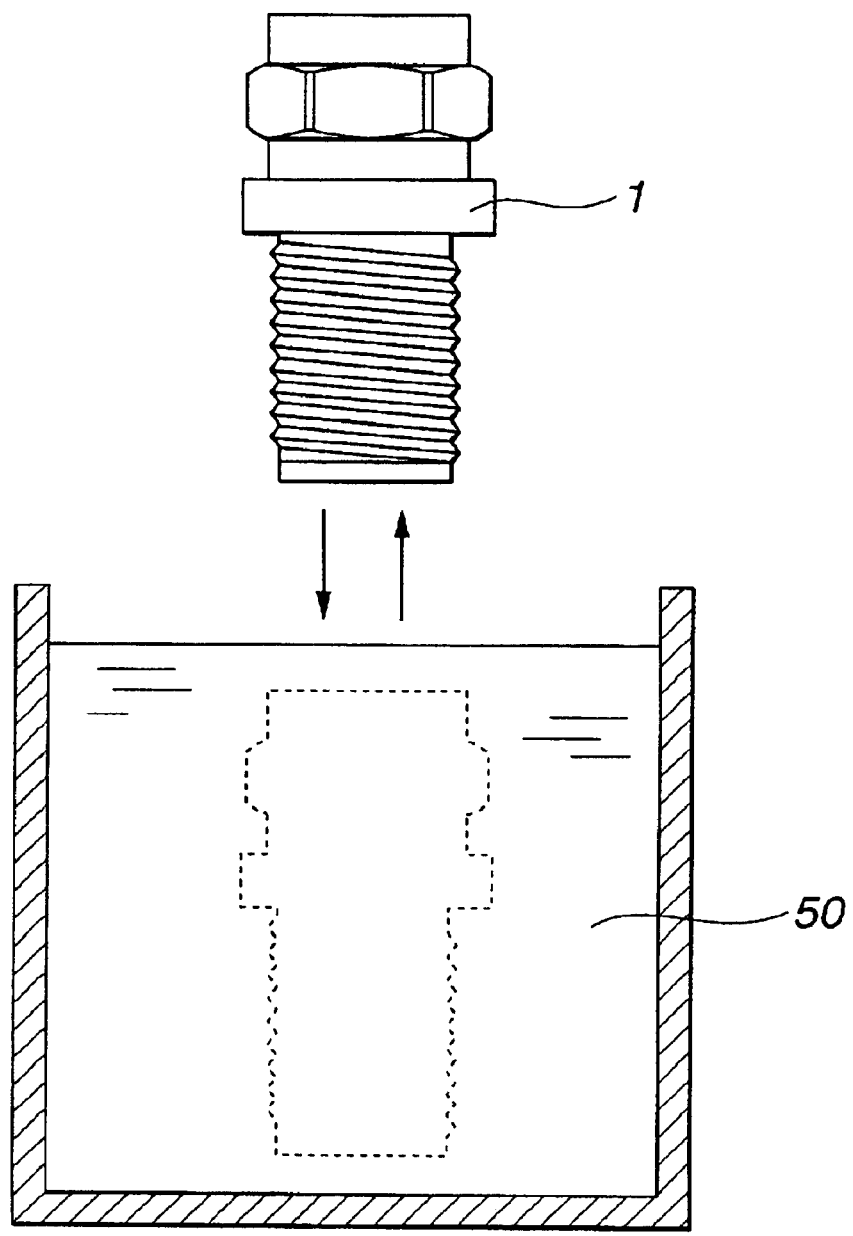
FIG. 2 is a schematic view of the chromate treatment of a metal body of the spark plug.

FIG. 2 schematically shows a process for forming the chromate film 42 on the metal body 1. In this process, the metal body 1, which has a zinc plating layer of a predetermined thickness formed by a conventional electrolytic zinc plating method or the like, can be immersed in a chromate treatment bath 50. With this, the chromate film 42 is formed on the zinc plating layer 41. As disclosed in the above-mentioned German Patent publication, the chromate treatment bath 50 may contain a necessary amount of chromate ions and a certain amount of an organic acid as a complexing agent. In the actual chromate film formation, it is possible to use a conventional barrel plating, in which a liquid permeable barrel (container) containing the metal bodies 1 is rotated in the chromate treatment bath 50, or the like for improving the treatment efficiency. After the metal body 1 is withdrawn from the chromate treatment bath 50, it is washed by immersion in a washing water or by spraying with a washing water. After drying, the next step is conducted. The used washing water must be treated as a chromate waste liquid, since it may contain the dissolved chromium component, zinc component and an organic component(s) (e.g., complexing agent). Furthermore, a chromate treatment liquid that has reached its lifetime after its repeated use can be diluted to have a suitable solute concentration that is, for example, the same as that of the used washing water. The diluted chromate treatment liquid must be treated as a chromate waste liquid, too. In fact, such chromate waste liquid is subjected to the chromium component removal and the neutralization, as described in detail as follows.

Figure 3:
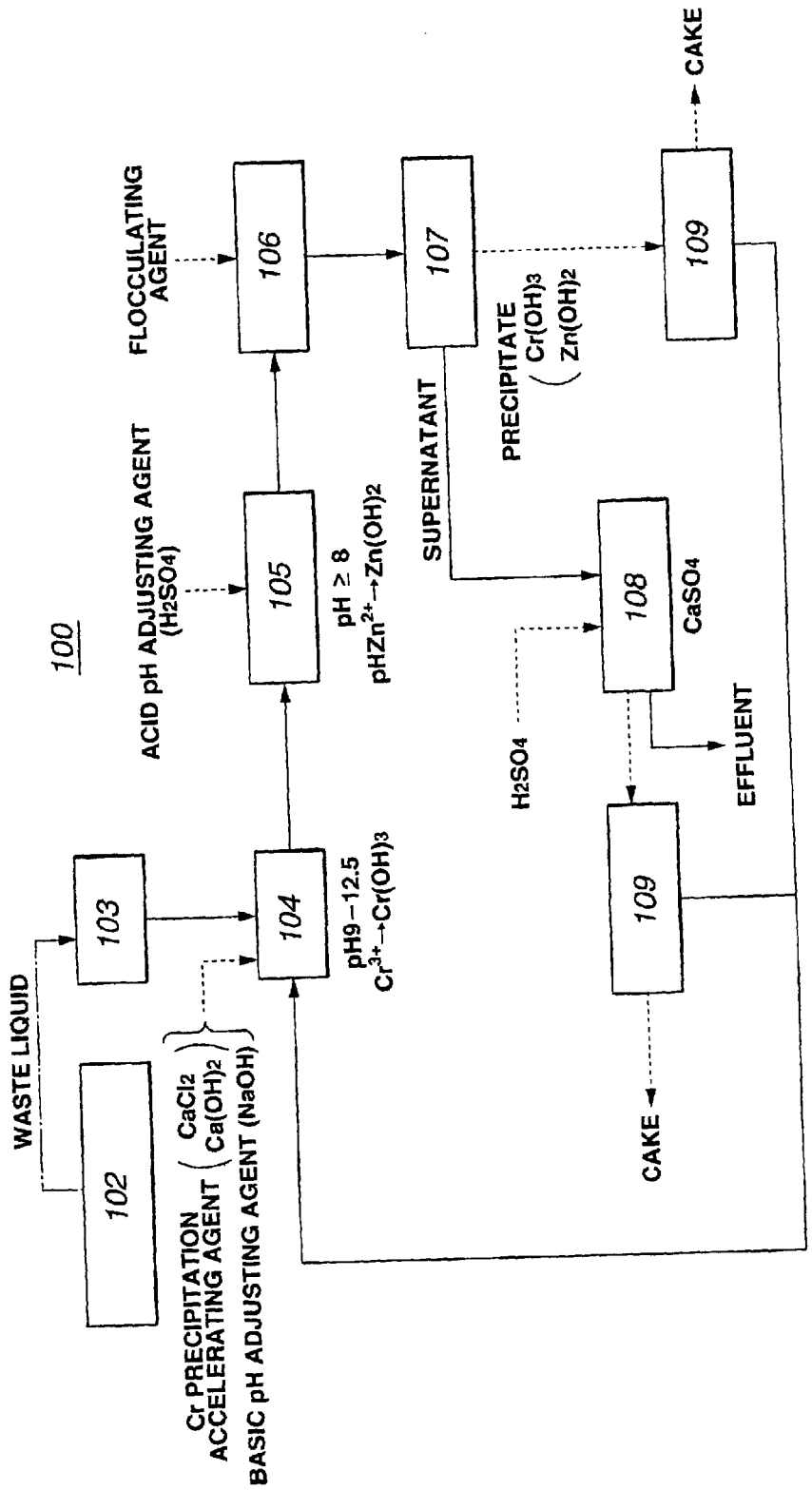
FIG. 3 is a schematic view of an exemplary chromate waste liquid treatment line.

FIG. 3 schematically shows an exemplary chromate waste liquid treatment line 100. In this line, a chromate waste liquid generated in a chromate treatment line 102, such as the chromate treatment bath 50 and a washing bath (not shown), is stored in a storage vessel 103. For conducting the waste liquid treatment, the waste liquid is transferred from the storage vessel 103 to the reaction vessel 104. Then, a suitable amount of a chromium precipitation accelerating agent, $Ca(OH)_2$ or $CaCl_2$, is added to the waste liquid. In case that $CaCl_2$ is used, NaOH is also added as a basic pH adjusting agent. Thus, pH of the waste liquid is adjusted to and maintained at a first value of 9–12.5 (preferably 10–12.5). With this, the dissolved chromium component ($Cr^{3+}$) is precipitated in the reaction vessel 104 in the form of $Cr(OH)_3$ and/or the like. The resulting precipitate is in the form of fine particles, and most of them are dispersed in the liquid. The sedimentation rate of the fine particles is slow. After adding the chromium precipitation accelerating agent, it is preferable to conduct stirring of the waste liquid in order to further accelerate the chromium precipitation. The stirring time is preferably 0.5 hr or longer in order to sufficiently accelerate the reaction. The maximum stirring time is not particularly limited, and may be about 2 hours in view of the balance between the reaction acceleration and the working efficiency.

In case that a chromate film has been formed on a zinc plating layer, a resulting waste liquid contains a significant amount of a zinc component (for example, about 5–100 ppm of dissolved zinc) as well as the chromium component. In this case, it may be preferable to decrease the pH of the waste liquid from the first value (9–12.5) to a second value of 8 or higher, thereby precipitating the zinc component. If the second value is lower than 8, it may decrease the efficiency of the after-mentioned flocculation (aggregation) treatment of the chromium component precipitate. If the second value is higher than 10, the zinc precipitation acceleration may become insufficient. Even if the zinc component removal is not considerably accelerated by the above pH decrease from the first value to the second value, this pH decrease may be effective for optimizing the after-mentioned flocculation treatment using an anion-type high-molecular flocculation agent.

An acid pH adjusting agent for decreasing the pH of the waste liquid can be selected from inorganic acids (e.g., $H_2SO_4$, $HNO_3$ and HCl). Of these, it is preferable to use $H_2SO_4$, since $HNO_3$ and HCl respectively contain nitrogen and chlorine that may cause environmental problem. In case of using $H_2SO_4$ as the pH adjusting agent, a large amount of $CaSO_4$ may be precipitated by decreasing the pH value to a value of lower than 8 through the reaction between $H_2SO_4$ and $CaCl_2$ or $Ca(OH)_2$, thereby inhibiting a smooth treatment. Therefore, the second value should be 8 or higher in pH in order to suppress the formation of $CaSO_4$. In FIG. 3, the waste liquid (overflow) is introduced from the reaction vessel into a pH adjusting vessel 105, and then $H_2SO_4$ is added to the waste liquid for adjusting the pH of the waste liquid.

It is possible to flocculate the chromium component containing precipitate by adding a high-molecular flocculating agent to the waste liquid after the formation of the chromium component containing precipitate. This flocculation accelerates the sedimentation of the chromium component containing precipitate. The flocculating agent can be selected from nonionic (or weakly anionic) flocculating agents such as polyacrylamide; cationic flocculating agents such as quaternary salt polymers (or copolymers) of aminoalkylacrylate (or aminoalkylmethacrylate), salts (or quaternary salts) of polyaminomethylacrylamide, and chitosan (acetate); and anionic flocculating agents such as acrylamide/sodium acrylate copolymer, acrylamide/sodium acrylate/sodium 2-acryloylamino-2-methylpropanesulfonate copolymer, and sodium polyacrylate. Of these, it is particularly preferable to use polyacrylamide, since it has a high solubility in water and a high capability for flocculating the chromium component containing precipitate.

The amount of the high-molecular flocculating agent may be varied depending on its type. For example, it may be preferable to add about 1–5 ml of a solution containing about 0.01% of a flocculating agent, per liter of the waste liquid. As shown in FIG. 3, the waste liquid (overflow) after its pH adjustment 105 is introduced into a flocculation vessel 106, followed by addition of a flocculation agent. Then, the sedimentation of the flocculated precipitate (chromium-containing precipitate and/or zinc-containing precipitate) is allowed in a sedimentation vessel 107 to achieve a solid-liquid separation.

It is possible to further accelerate the precipitation of the dissolved chromium component or the dissolved zinc component by allowing the waste liquid to stand for a predetermined time (e.g., 30 minutes or longer) from the completion of adding the chromium precipitation accelerating agent until the completion of the above solid-liquid separation, thereby further decreasing the dissolved chromium or zinc component concentration. For example, it is possible to decrease the dissolved chromium concentration by allowing the waste liquid to stand from the completion of adding the chromium precipitation accelerating agent. It is optional to conduct the above-mentioned stirring during this standing. Furthermore, it is possible to decrease the dissolved chromium and zinc component concentrations by allowing the waste liquid to stand for a predetermined time from the completion of adding the high-molecular flocculating agent until the completion of the solid-liquid separation.

Figure 4:
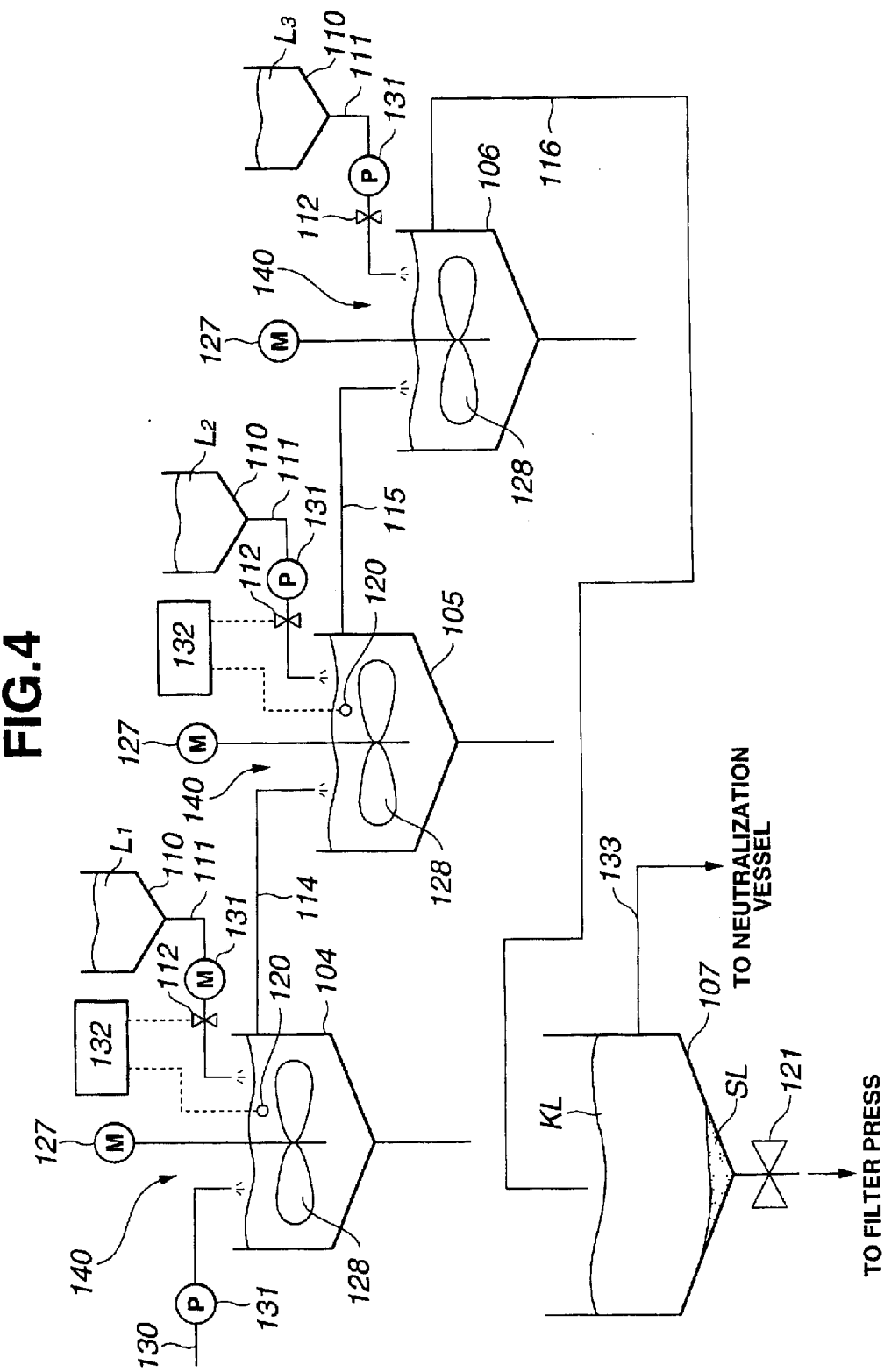
FIG. 4 is a schematic detailed view of the chromate waste liquid treatment line of FIG. 3.
Figure 6A:
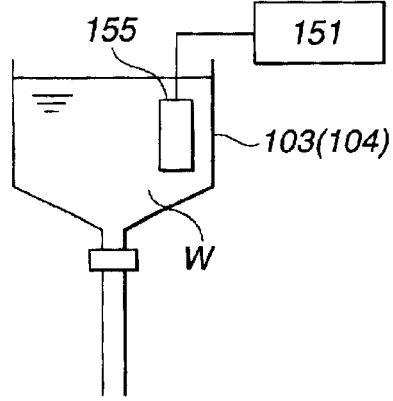
FIGS. 6(a) to 6(d) are schematic views showing mechanisms for heating a chromate waste liquid.
Figure 6B:
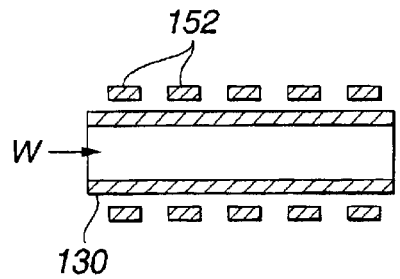
Figure 6C:
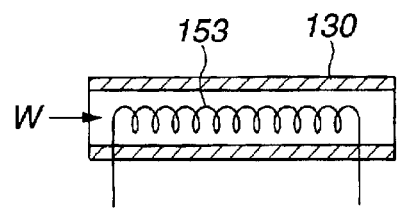
Figure 6D:
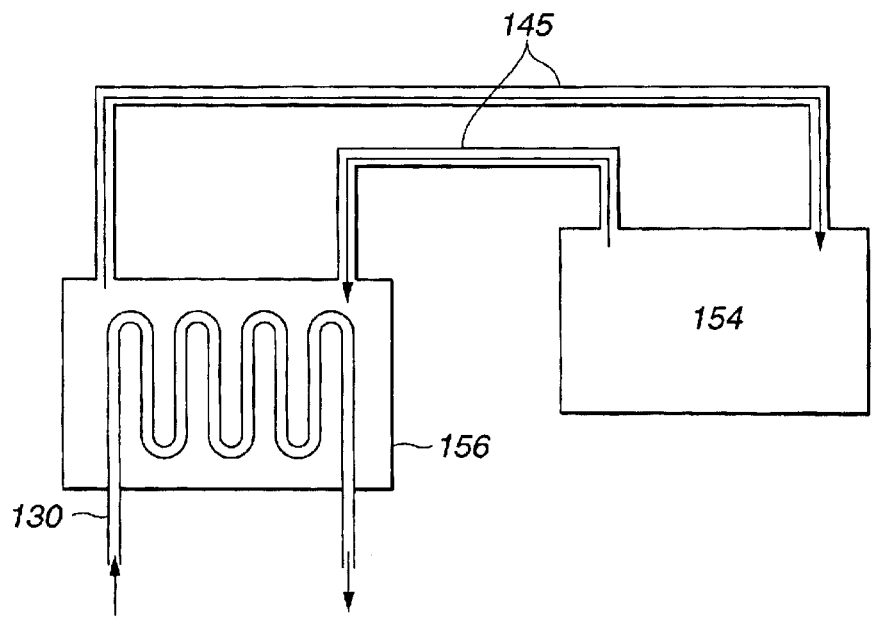

FIG. 4 schematically shows details of the chromate waste liquid treatment line of FIG. 3. As is seen from FIG. 4, a chromate waste liquid is introduced into the reaction vessel 104 through a waste liquid supplying conduit 130. This conduit 130 is equipped with a pump 131 for moving the waste liquid toward the reaction vessel 104. A chromium precipitation accelerating agent $L_1$ is stored in a reagent tank 110 and is introduced into the reaction vessel 104 through a conduit 111. The amount of this agent to be introduced into the reaction vessel 104 can easily be regulated by a magnetic valve 112 on the conduit 111. A pH meter 120 is provided in the reaction vessel 104 for measuring pH of the waste liquid.

This pH meter can be a conventional one using an antimony electrode or a liquid membrane type electrode. When a suspension of $Ca(OH)_2$, which has a high capability to adjust (increase) the pH, is used as the chromium precipitation accelerating agent $L_1$, the amount of this agent to be introduced into the reaction vessel 104 is controlled by a controller 132 to adjust the waste liquid to having a first pH in a range of 9–12.5 (preferably 10–12.5), based on the pH value obtained by the pH meter 120. In contrast, when a chromium precipitation accelerating agent (e.g., $CaCl_2$), which has a low capability to adjust the pH, the amount of a basic pH adjusting agent (NaOH) to be introduced into the reaction vessel 104 can be controlled by the controller 132 to adjust the waste liquid to having the above first pH range, based on the pH value obtained by the pH meter 120.

The controller 132 shown in FIG. 4 is, for example, mainly formed of a computer and controls the magnetic valve 112 by sending a signal to open or close the same, based on the pH value obtained by the pH meter 120, thereby regulating the amount of the chromium precipitation accelerating agent or the basic pH adjusting agent to be introduced into the reaction vessel 104 and thereby adjusting the waste liquid to having the above pH range. The magnetic valve 112 can be one that takes only a fully opened position and a fully closed position. In this case, the control of this valve can be conducted by adjusting the opening time of the valve 112 or by controlling the duty ratio of the opening time and the closing time. Alternatively, the magnetic valve 112 can be a magnetic proportional control valve in which the degree of opening is variable. In this case, the control of this valve can be conducted by adjusting the degree of opening to regulate the flow rate of the above-mentioned reagent.

As shown in FIG. 4, the reaction vessel is provided with a stirring mechanism 140 for accelerating the precipitation and for temporarily dispersing the precipitate. The waste liquid is introduced from the reaction vessel 104 into the pH adjusting vessel 105 through a waste liquid conduit 114, while the precipitate is dispersed in the reaction vessel 104. With this, the precipitate does not accumulate in the reaction vessel 104, and it becomes possible to collect the precipitate at one time at a downstream position of the treatment line. The stirring mechanism 140 comprises a stirring blade 128 and a motor 127 for rotating this blade. Alternatively, this stirring may be conducted by ultrasonic stirring or the like. The waste liquid conduit 114 can be constructed in a manner to dispose an inlet of this conduit at the liquid level or at a position slightly lower than the liquid level for allowing overflow into this conduit.

As shown in FIG. 4, the waste liquid (dispersion) is introduced from the reaction vessel 104 into the pH adjusting vessel 105 through the conduit 114. Then, the first pH of 9–12.5 is lowered to the second pH of 8 or higher in the pH adjusting vessel 105 by controlling the amount of an acid pH adjusting agent $L_2$ (e.g., sulfuric acid) to be added from a reagent tank 110 to the pH adjusting vessel 105. This control is conducted by a controller 132 to regulate a magnetic valve 112. Similar to the reaction vessel 104, the pH adjusting vessel 105 is also provided with a stirring mechanism 140. With this, the precipitate is allowed to flow downstream.

As shown in FIG. 4, the waste liquid (dispersion) is introduced from the pH adjusting vessel 105 into the flocculation vessel 106 through a conduit 115. Then, a high-molecular flocculation agent $L_3$ is added from a reagent tank 110 to the flocculation vessel 106, while the amount of the flocculation agent $L_3$ is regulated in accordance with the amount of the waste liquid introduced into the flocculation vessel 106. This regulation is conducted by controlling a magnetic valve 112. Similar to the reaction vessel 104, the flocculation vessel 106 is also provided with a stirring mechanism 140. With this, the precipitate is allowed to flow downstream. The waste liquid (dispersion) is introduced from the flocculation vessel 106 into a sedimentation vessel 107 through a conduit 116. In the sedimentation vessel 107, the waste liquid is allowed to stand still for achieving sedimentation of the precipitate SL. The resulting waste liquid (supernatant) KL is introduced from the sedimentation vessel 107 into the neutralization vessel 108. When the precipitate SL accumulates in a predetermined amount, the precipitate (slurry) containing the chromium component is introduced from the sedimentation vessel 107 into a filter press device 109 (see FIG. 3) by opening a valve 121 In the filter press device 109, liquid is removed from the slurry to collect a cake containing the chromium component. This liquid is returned to the reaction vessel 104. The waste liquid (supernatant) is neutralized in the neutralization vessel 108 (see FIG. 3) and then discharged as a final effluent. For example, it is possible to remove a dissolved calcium component from the liquid by conducting this neutralization using an acid (e.g., $H_2SO_4$) that forms a salt (substantially insoluble in water) with calcium. When this acid is $H_2SO_4$, the resulting salt is $CaSO_4$. It is optional to collect this salt (precipitate) by using the filter press device 109.

FIG. 5 shows another exemplary chromate waste liquid treatment line 200, in which a magnesium-containing compound is used as the chromium precipitation accelerating agent. The steps of this treatment line 200 until the neutralization 108 are substantially the same as those of the above-mentioned treatment line 100 of FIG. 3. Therefore, parts substantially the same as those of the treatment line 100 are denoted by the same numerals and a detailed explanation of them will be omitted from the following description. As shown in FIG. 5, $MgCl_2$ (chromium precipitation accelerating agent) is added to the reaction vessel 104, and NaOH (basic pH adjusting agent) is added thereto to adjust the waste liquid to having a pH of 9–12.5. It is possible to conduct a neutralization in the neutralization vessel 108 by using an acid (e.g., $H_2SO_4$) that does not form a precipitate with the dissolved magnesium component. With this neutralization, a water-soluble salt ($MgSO_4$) is formed, thereby not generating a precipitate. After the neutralization, the liquid can be subjected to a reverse osmosis filtration 113 or an ion exchange, thereby removing the dissolved magnesium together with other electrolytic components. This reverse osmosis filtration 113 can be conducted by using a conventional reverse osmosis membrane module such as a hollow fiber type membrane module. After the dissolved magnesium removal, the liquid can be returned to the storage vessel 103, the reaction vessel 104 or the neutralization vessel 108. Alternatively, the liquid can be reused as a washing water in the chromate treatment line 102 or for preparing a chromate treatment bath. With this, a closed treatment line is achieved.

It is possible to sufficiently proceed the dissolved chromium component removal, even if the waste liquid has normal temperature. It is, however, possible to further accelerate the dissolved chromium component precipitation by increasing the liquid temperature to 20° C. or higher, preferably 25° C. or higher, more preferably 30° C. or higher. It is preferable to suitably adjust the liquid temperature to the extent of not generating an excessive evaporation of the liquid. For example, the liquid temperature may have a highest temperature of about 85° C. The temperature of a washing water may have a temperature of 10° C. or lower in the winter and a temperature of about 15° C. or lower in the summer. Thus, it may be preferable to heat the waste liquid to have a temperature of 20° C. or higher.

FIGS. 6(a), 6(b), 6(c) and 6(d) schematically show various mechanisms for heating the waste liquid. In fact, the heating mechanism of FIG. 6(a) includes a heater 155 for heating the waste liquid W in the storage vessel 103 or the reaction vessel 104. The heater 155 can be an electric heater that generates heat by applying electricity from a heating power source 151. The heating mechanism of FIG. 6(b) includes a heater 152 for heating the waste liquid supplying conduit 130 from outside. That of FIG. 6(c) includes a heater 153 disposed in the conduit 130 for directly heating the waste liquid W. In the heating mechanism of FIG. 6(d), a waste heat source 154 in a factory, such as an incinerator for spark plug insulators and various heat treatment furnaces, is used as a source for heating the waste liquid. A warm water used as a cooling water for cooling the waste heat source 154 is introduced into a heat exchanger 156 through a cooling water pipe 145. Then, the waste liquid is introduced into the heat exchanger 156 through a conduit 130 and is brought into contact with the warm water for heating the waste liquid. Alternatively, it is possible to use the waste liquid itself as a cooling medium of the waste heat source 154.

It is needless to say that the present invention can be used for treating a chromate waste liquid generated by a chromate treatment of various members other than the spark plug metal body.

The following nonlimitative examples are illustrative of the present invention.

EXAMPLE 1

A chromate treatment bath was prepared by dissolving, 50 g of chromium(III) chloride ($CrCl_3 \cdot 6H_2O$), 3 g of cobalt(II) nitrate ($Co(NO_3)_2$), 100 g of sodium nitrate ($NaNO_3$), and 31.2 g of malonic acid, per liter of deionized water. Then, the liquid temperature of the bath was maintained at 60° C. by heater, and its pH was adjusted to 2.0 by adding a caustic soda aqueous solution. The resulting chromate treatment bath was repeatedly used for a chromate treatment of zinc-plated steel members until it reached lifetime. After that, the liquid was diluted with pure water to prepare first, second and third initial chromate waste liquids respectively containing 10 ppm by weight, 50 ppm by weight and 100 ppm by weight of the dissolved chromium. Then, a suspension of $Ca(OH)_2$ (chromium precipitation accelerating agent) was added in an amount to have a pH after 30 minutes stirring (see Table 1). Then, a 75% sulfuric acid aqueous solution was added to the waste liquid to adjust its pH to 8. Then, a 0.01% polyacrylamide (high-molecular flocculation agent) aqueous solution was added in an amount of 2 ml per liter of the waste liquid, followed by stirring and then standing still for about 5 min, thereby achieving sedimentation of the precipitate. The resulting supernatant was analyzed with an atomic absorption photometer to determine the total dissolved chromium content and the dissolved zinc content. The results are shown in Table 1.

TABLE 1

| Initial Cr Conc. of Chromate Waste Liquid (ppm by weight) | pH adjusted by $Ca(OH)_2$ | Total Dissolved Cr after Sedimentation (ppm by weight) | Dissolved Zn after Sedimentation (ppm by weight) |
|---|---|---|---|
| 10 (1st Waste Liquid) | 6.9 | 5.95 | 1.06 |
| | 7.8 | 4.79 | 0.86 |
| | 8.9 | 3.44 | 0.62 |
| | 9.8 | 1.16 | 0.07 |
| | 10.7 | 0.66 | 0.05 |
| | 11.9 | 0.44 | 0.02 |
| | 12.6 | 0.31 | 0.02 |
| 50 (2nd Waste Liquid) | 6.8 | 24.9 | 4.43 |
| | 7.8 | 16.7 | 1.23 |
| | 8.7 | 9.46 | 0.30 |
| | 9.7 | 6.27 | 0.03 |
| | 10.8 | 3.68 | 0.02 |
| | 12.1 | 1.78 | 0.01 |
| | 12.5 | 1.39 | 0.01 |
| 100 (3rd Waste Liquid) | 6.9 | 51.3 | 6.85 |
| | 7.9 | 37.4 | 1.82 |
| | 8.9 | 22.95 | 0.40 |
| | 9.7 | 14.25 | 0.03 |
| | 10.6 | 4.99 | 0.01 |
| | 11.9 | 2.58 | 0.01 |
| | 12.5 | 1.78 | 0.02 |

It is understood from Table 1 that as the pH of the waste liquid after the addition of the chromium precipitation accelerating agent ($Ca(OH)_2$) became higher, the dissolved chromium content after the sedimentation of the precipitate decreased, irrespective of the initial dissolved chromium content prior to the treatment. In fact, the dissolved chromium content was remarkably low if the pH adjusted by the addition of $Ca(OH)_2$ was 9 or higher, particularly 10 or higher. Furthermore, the dissolved zinc content was lower than 1 ppm by weight if the adjusted pH was 9 or higher. The initial chromate waste liquid may contain a small amount of hexavalent chromium. Even in this case, it is also possible to reduce the dissolved hexavalent chromium by increasing the pH of the waste liquid.

EXAMPLE 2

An initial chromate waste liquid containing 70 ppm by weight of the dissolved chromium and 5 ppm by weight of the dissolved zinc was prepared by substantially the same process as that of Example 1. Then, 500 mg or 1,000 mg (in terms of Ca) of a $CaCl_2$ powder per liter of the waste liquid were added to the waste liquid. In fact, as shown in Table 2, first to fourth chromate liquids were each prepared by adding 500 mg (in terms of Ca) of the $CaCl_2$ powder per liter of the waste liquid, and fifth and sixth chromate waste liquids were each prepared by adding 1,000 mg (in terms of Ca) of the same. Then, a 2% NaOH aqueous solution was added to the first to sixth liquids to adjust their pH values to having those values shown in Table 2. After that, each liquid was stirred for a period of time (0.5–2.0 hr) shown in Table 2. Then, a 75% $H_2SO_4$ aqueous solution was added to each liquid to adjust its pH to 8, followed by the same steps as those of Example 1. The results are shown in Table 2.

TABLE 2

| | First Liquid | Second Liquid | Third Liquid |
|---|---|---|---|
| Added Ca (mg/l) | 500 | 500 | 500 |
| Adjusted pH | 9 | 10 | 11 |

TABLE 2-continued

| Stirring Time (hr) | Total Dissolved Cr (ppm) | Dissolved Zn (ppm) | Total Dissolved Cr (ppm) | Dissolved Zn (ppm) | Total Dissolved Cr (ppm) | Dissolved Zn (ppm) |
|---|---|---|---|---|---|---|
| 0.5 | 22.7 | 0.01 | 8.97 | <0.01 | 2.80 | <0.01 |
| 1.0 | 12.8 | 0.05 | 3.32 | 0.01 | 0.76 | <0.01 |
| 1.5 | 7.04 | 0.01 | 1.29 | <0.01 | 0.35 | <0.01 |
| 2.0 | 3.35 | <0.01 | 0.47 | <0.01 | 0.19 | <0.01 |

| | Fourth Liquid | Fifth Liquid | Sixth Liquid |
|---|---|---|---|
| Added Ca (mg/l) | 500 | 1,000 | 1,000 |
| Adjusted pH | 12 | 10 | 11 |

| Stirring Time (hr) | Total Dissolved Cr (ppm) | Dissolved Zn (ppm) | Total Dissolved Cr (ppm) | Dissolved Zn (ppm) | Total Dissolved Cr (ppm) | Dissolved Zn (ppm) |
|---|---|---|---|---|---|---|
| 0.5 | 1.92 | 0.01 | 3.09 | 0.01 | 1.10 | <0.01 |
| 1.0 | 0.59 | <0.01 | 1.00 | <0.01 | 0.38 | <0.01 |
| 1.5 | 0.29 | <0.01 | 0.49 | 0.01 | 0.20 | 0.01 |
| 2.0 | 0.19 | <0.01 | 0.29 | 0.02 | 0.12 | <0.01 |

It is understood from Table 2 that there is a clear tendency that each of the total dissolved chromium component concentration and the dissolved zinc component concentration decreased with a longer stirring time.

EXAMPLE 3

An initial chromate waste liquid containing 60 ppm by weight of the dissolved chromium and 30 ppm by weight of the dissolved zinc was prepared by substantially the same process as that of Example 1. Then, a 60% $CaCl_2$ aqueous solution in an amount of 600 mg (in terms of Ca) per liter of the waste liquid was added to the waste liquid. Then, a 2% NaOH aqueous solution (basic pH adjusting agent) was added to the waste liquid, thereby adjusting its pH to 11. While its pH was maintained at 11, the waste liquid was stirred for 5 min.

Then, its pH was adjusted to a pH of 9–10 by adding $H_2SO_4$.

Figure 7A:
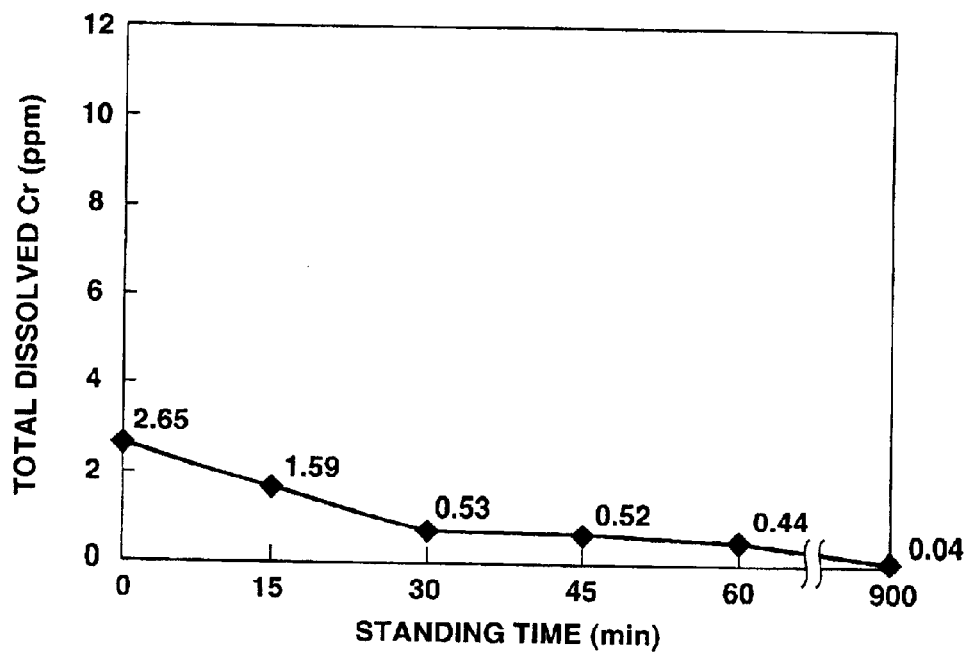
FIGS. 7(a) and 7(b) are graphs respectively showing the total dissolved chromium concentration and the dissolved zinc concentration changes with the period of time for allowing the waste liquid to stand still.
Figure 7B:
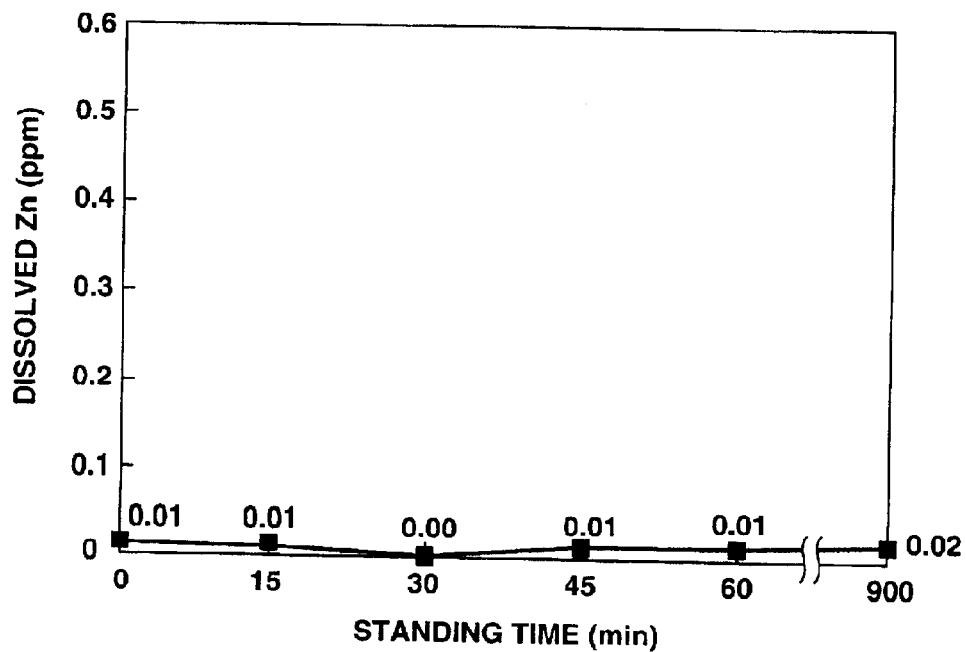

Then, a 0.01% polyacrylamide (high-molecular flocculation agent) aqueous solution in an amount of 2 ml per liter of the waste liquid was added to the waste liquid, followed by stirring. Then, the waste liquid was allowed to stand still for periods of time (0–900 min) shown in FIGS. 7a and 7b, thereby achieving sedimentation of the precipitate. After a period of time of FIGS. 7a and 7b, the resulting supernatant was analyzed to determine the total dissolved chromium content and the dissolved zinc content. It is understood from FIG. 7a that the total dissolved chromium content decreased with a longer time of the standing still.

EXAMPLE 4

An initial chromate waste liquid was prepared by the same process as that of Example 3. Then, a $MgCl_2$ powder, in place of the $CaCl_2$ aqueous solution, in amounts (in terms of magnesium) per liter of the waste liquid as shown in Table 3, was added to the waste liquid, thereby preparing each of first to eighth liquids of Table 3. Then, each liquid was adjusted to having a pH of Table 3 by adding a 10% NaOH aqueous solution (basic pH adjusting agent). While maintaining this pH, each liquid was stirred for a period of time shown in Table 3. After that, a 0.01% polyacrylamide (high-molecular flocculation agent) aqueous solution in an amount of 2 ml per liter of the waste liquid was added to the waste liquid, followed by stirring. Then, the waste liquid was allowed to stand still for 30 min, thereby achieving sedimentation of the precipitate. Then, the resulting supernatant was analyzed to determine the total dissolved chromium content and the dissolved magnesium content.

TABLE 3

| | 1st Liquid | 2nd Liquid | 3rd Liquid | 4th Liquid | 5th Liquid | 6th Liquid | 7th Liquid | 8th Liquid |
|---|---|---|---|---|---|---|---|---|
| Added Mg (mg/l) | 200 | 200 | 200 | 200 | 200 | 300 | 300 | 500 |
| pH | 10 | 11 | 12 | 11 | 12 | 11 | 12 | 11 |
| Stirring Time (min) | 30 | 30 | 30 | 90 | 90 | 90 | 90 | 30 |
| Total Cr (ppm) | 3.78 | 1.84 | 2.50 | 0.51 | 1.40 | 0.15 | 1.06 | 0.05 |
| Mg Conc. (ppm) | 60.6 | 18.1 | 16.8 | 6.2 | 0.4 | 16.9 | 0.7 | 23.0 |

It is understood from Table 3 that it was possible to effectively remove the chromium by adding $MgCl_2$ and by adjusting pH to 9 or higher, and that the dissolved magnesium decreased with higher pH. Furthermore, the total dissolved chromium tended to increase by increasing pH from 11 to 12. This is assumed to be the occurrence of the chromium redissolution (dissolution of once precipitated chromium).

EXAMPLE 5

A first process was conducted as follows. Initial chromate waste liquids each containing 100 ppm by weight of the dissolved chromium and 200 ppm by weight of the dissolved zinc were prepared by substantially the same process as that of Example 1. Then, each waste liquid was heated by a heater to a temperature of 19° C., 25° C., 30° C. or 40° C. (see Table 4) and maintained at this temperature. Then, a $Ca(OH)_2$ powder (chromium precipitation accelerating agent) in an amount of 0.4 g, 0.6 g or 0.9 g (in terms of Ca) per liter of the waste liquid was added to the waste liquid, followed by stirring for 30 min and then pH measurement. The results of this pH measurement are shown in Table 4. Then, a 75% $H_2SO_4$ aqueous solution was added to each liquid to decrease its pH to 8. Then, a 0.01% polyacrylamide (high-molecular flocculation agent) aqueous solution was added in an amount of 2 ml per liter of the waste liquid, followed by stirring and then standing still for about 5 min, thereby achieving sedimentation of the precipitate. The resulting supernatant was analyzed with an atomic absorption photometer to determine the total dissolved chromium content and the dissolved zinc content. The results are shown in Table 4.

TABLE 4

|  | Heating Temp. | | | |
| --- | --- | --- | --- | --- |
|  | 19° C. | 25° C. | 30° C. | 40° C. |
| Added Ca(OH)$_2$: 0.4 g/l | | | | |
| Cr Conc. (ppm) | 3.6 | 2.0 | 0.3 | 0.2 |
| Zn Conc. (ppm) | 0.11 | 0.05 | 0.02 | 0.02 |
| pH | 11.8 | 11.3 | 11.0 | 10.3 |
| Added Ca(OH)$_2$: 0.6 g/l | | | | |
| Cr Conc. (ppm) | 3.1 | 2.4 | 0.3 | 0.02 |
| Zn Conc. (ppm) | 0.10 | 0.09 | 0.01 | 0.02 |
| pH | 12.0 | 11.7 | 11.4 | 11.3 |
| Added Ca(OH)$_2$: 0.9 g/l | | | | |
| Cr Conc. (ppm) | 1.9 | 1.0 | 0.2 | 0.2 |
| Zn Conc. (ppm) | 0.08 | 0.06 | 0.01 | 0.03 |
| pH | 12.0 | 12.0 | 11.8 | 12.0 |

As is seen from Table 5, a second process was conducted in the same manner as that of the first process except in that each waste liquid was heated by the heater to a temperature of 25° C., 30° C. or 40° C., that the Ca(OH)$_2$ powder in an amount of 0.9 g (in terms of Ca) per liter of the waste liquid was added, and the stirring was conducted for 5 min, 10 min or 15 min. The results are shown in Table 5.

TABLE 5

|  | Heating Temp. | | |
| --- | --- | --- | --- |
|  | 25° C. | 30° C. | 40° C. |
| Stirring Time: 5 min | | | |
| Cr Conc. (ppm) | 3.3 | 1.2 | 0.6 |
| Zn Conc. (ppm) | 0.02 | 0.02 | 0.04 |
| pH | 12.0 | 11.8 | 12.0 |
| Stirring Time: 10 min | | | |
| Cr Conc. (ppm) | 2.7 | 0.8 | 0.3 |
| Zn Conc. (ppm) | 0.03 | 0.01 | <0.01 |
| pH | 12.0 | 11.8 | 12.0 |
| Stirring Time: 15 min | | | |
| Cr Conc. (ppm) | 1.5 | 0.7 | 0.3 |
| Zn Conc. (ppm) | 0.06 | 0.03 | 0.01 |
| pH | 12.0 | 11.8 | 12.0 |

As is seen from Table 6, a third process was conducted in the same manner as that of the second process except in that the Ca(OH)$_2$ powder in an amount of 0.6 g (in terms of Ca) per liter of the waste liquid was added. The results are shown in Table 6.

TABLE 6

|  | Heating Temp. | | |
| --- | --- | --- | --- |
|  | 25° C. | 30° C. | 40° C. |
| Stirring Time: 5 min | | | |
| Cr Conc. (ppm) | 6.0 | 2.8 | 0.7 |
| Zn Conc. (ppm) | 0.06 | 0.03 | <0.01 |
| pH | 11.7 | 11.4 | 10.3 |
| Stirring Time: 10 min | | | |
| Cr Conc. (ppm) | 4.0 | 1.1 | 0.3 |
| Zn Conc. (ppm) | 0.03 | 0.02 | <0.01 |
| pH | 11.7 | 11.4 | 10.3 |
| Stirring Time: 15 min | | | |
| Cr Conc. (ppm) | 3.6 | 0.5 | 0.4 |
| Zn Conc. (ppm) | 0.05 | 0.01 | 0.11 |
| pH | 11.7 | 11.4 | 10.3 |

As is seen from Table 7, a fourth process was conducted in the same manner as that of the first process except in that each waste liquid was heated by the heater to a temperature of 30° C. or 40° C., that the Ca(OH)$_2$ powder in an amount of 0.4 g (in terms of Ca) per liter of the waste liquid was added, and the stirring was conducted for 5 min, 10 min, 15 min or 30 min. The results are shown in Table 7.

TABLE 7

|  | Heating Temp. | |
| --- | --- | --- |
|  | 30° C. | 40° C. |
| Stirring Time: 5 min | | |
| Cr Conc. (ppm) | 3.4 | 0.7 |
| Zn Conc. (ppm) | 0.06 | <0.01 |
| pH | 11.0 | 10.3 |
| Stirring Time: 10 min | | |
| Cr Conc. (ppm) | 2.0 | 0.3 |
| Zn Conc. (ppm) | 0.05 | <0.01 |
| pH | 11.0 | 10.3 |
| Stirring Time: 15 min | | |
| Cr Conc. (ppm) | 2.0 | 0.4 |
| Zn Conc. (ppm) | 0.03 | 0.11 |
| pH | 11.0 | 10.3 |
| Stirring Time: 30 min | | |
| Cr Conc. (ppm) | 0.3 | — |
| Zn Conc. (ppm) | 0.02 | — |
| pH | 11.0 | — |

It is understood from Tables 4–7 that the dissolved chromium concentration has reached a regulated value of 5 ppm by weight or lower with a shorter time as the exhaust liquid temperature became higher. In particular, it is understood from Table 7 that, when the exhaust liquid temperature was 30° C. or 40° C., the dissolved chromium concentration has reached the regulated value with a stirring time or 5 min or shorter although the amount of Ca(OH)$_2$ powder was decreased to 0.4 g per liter of the waste liquid.

The entire disclosure of Japanese Patent Application No. 2000-232518 filed on Jul. 31, 2000, including specification, claims, drawings and summary, is incorporated herein by reference in its entirety.

What is claimed is:

1. A process for treating a chromate waste liquid containing an organic acid component and zinc component, said process comprising:

adding a chromium precipitation accelerating agent comprising at least one of a calcium component and a magnesium component and capable of increasing the pH of said chromate waste liquid to a pH of 10.3 or higher, to said chromate waste liquid to increase pH of said chromate waste liquid to have a first pH of 10.3 or higher and stirring to thereby precipitating a chromium component from said chromate waste liquid, adding an acid to lower the pH of the waste liquid from said first pH to second pH of 10 or lower and stirring to precipitate the zinc component, and adding a flocculation agent to achieve sedimentation of the chromium and zinc precipitates.

2. A process according to claim 1, wherein said chromium precipitation accelerating agent comprises at least one of a calcium-containing inorganic compound and a magnesium-containing inorganic compound.

3. A process according to claim 2, wherein said chromium precipitation accelerating agent comprises said calcium-containing inorganic compound, and
wherein said precipitated chromium component is separated from said chromate waste liquid, and then said chromate waste liquid is neutralized with an acid that is reactive with a calcium component dissolved in said chromate waste liquid, thereby turning said dissolved calcium component into a calcium-containing precipitate.

4. A process according to claim 2, wherein said chromium precipitation accelerating agent comprises said magnesium-containing inorganic compound, and
wherein said precipitated chromium component is separated from said chromate waste liquid, then said chromate waste liquid is neutralized with an acid, and then a dissolved magnesium component is removed from said chromate waste liquid by a reverse osmosis or an ion exchange.

5. A process according to claim 4, wherein said acid is such that said dissolved magnesium component remains in a dissolved form even after said neutralization.

6. A process according to claim 1, wherein said chromium precipitation accelerating agent comprises at least one compound selected from the group consisting of $Ca(OH)_2$, $CaCl_2$ and $MgCl_2$.

7. A process according to claim 1, wherein, prior to adding said chromium precipitation accelerating agent, a chromium concentration of said chromate waste liquid is from 10 to 1,000 ppm by weight.

8. A process according to claim 1, wherein said chromium precipitation accelerating agent comprises $CaCl_2$ and is added to said chromate waste liquid such that calcium of said $CaCl_2$ is in an amount of 500–1,000 mg per liter of said chromate waste liquid.

9. A process according to claim 1, wherein said chromium precipitation accelerating agent comprises $MgCl_2$ and is added to said chromate waste liquid such that magnesium of said $MgCl_2$ is in an amount of 200–500 mg per liter of said chromate waste liquid.

10. A process according to claim 1, wherein said chromate waste liquid is stirred for a period of time from 0.5 to 2 hr.

11. A process according to claim 1, wherein said second pH is 8 to 10.

12. A process according to claim 11, wherein said acid is $H_2SO_4$ and the pH of the waste liquid is lowered to about 8.

13. A process according to claim 1, wherein said agent is added while said chromate waste liquid is maintained at a temperature of 20° C. or higher.

14. A process according to claim 13, wherein said temperature is 25° C. or higher.

15. A process according to claim 14, wherein said temperature is 30° C. or higher.

16. A process according to claim 1, further comprising:
maintaining said chromate waste liquid at said first pH for a period of time of 0.5 hr or longer; and
adding a flocculating agent to said chromate waste liquid, thereby accelerating said precipitation of said chromium component.

17. A process according to claim 16, wherein said flocculating agent comprises polyacrylamide.

18. A process according to claim 1, further comprising maintaining said chromate waste liquid at said first pH, while said chromate waste liquid is stirred.

19. A process according to claim 1, wherein said first pH is from 10.3 to 12.5.

20. A process according to claim 1, wherein said first pH is from 10.3 to 12.5, and said first pH is maintained for a period of time to precipitate the chromium component.

21. A process according to claim 1, wherein said chromium precipitation accelerating agent comprises $Ca(OH)_2$.

22. A process according to claim 1, which comprises stirring to precipitate a chromium component for 30 minutes or longer.

23. A process according to claim 1, wherein said flocculation agent comprises polyacrylamide.

24. A process for treating a chromate waste liquid containing an organic acid component and zinc component, said process comprising the sequential steps of:
(a) adding a chromium precipitation accelerating agent that comprises at least one selected from the consisting of $CaCl_2$, $Ca(NO_3)_2$, $MgCl_2$, $Mg(NO_3)_2$, and $MgSO_4$, to said chromate waste liquid; and
(b) adding a basic pH adjusting agent that comprises at one compound selected from the group consisting of NaOH, KOH and LiOH, to a product of the step (a) to increase pH of said chromate waste liquid to have a first pH of 10.3 or higher and stirring to precipitate a chromium component from said chromate waste liquid, adding an acid to lower the pH of the waste liquid from said first pH to a second pH of 10 or lower and stirring to precipitate the zinc component, and adding a flocculation agent to achieve sedimentation of the chromium and zinc precipitates.

25. A process according to claim 24, wherein said chromium precipitation accelerating agent of the step (a) comprises at least one of $CaCl_2$ and $MgCl_2$.

26. A process according to claim 24, wherein said basic pH adjusting agent comprises NaOH.

27. A process according to claim 24, wherein said second pH is 8 to 10.

28. A process according to claim 27, wherein said acid is $H_2SO_4$ and the pH of the waste liquid is lowered to about 8.

29. A process according to claim 24, which comprises stirring to precipitate a chromium component for 30 minutes or longer.

30. A process according to claim 24, when said flocculation agent comprises polyacrylamide.

31. A process for treating a chromate waste liquid containing an organic acid component and zinc component, said process comprising:
adding $Ca(OH)_2$ to said chromate waste liquid and adjusting a pH of said chromate waste liquid to thereby precipitate a chromium component and zinc component from the waste liquid;

maintaining a pH of said chromate waste liquid in a vessel at a first pH of 10.3 or higher by controlling the volume of $Ca(OH)_2$ added to said chromate waste liquid in said vessel and thereby precipitating a chromium component from said chromate waste liquid decreasing the pH of the chromate waste liquid from said first pH to a second pH that is 8 or higher to precipitate the Zn component; and adding a flocculation agent to achieve sedimentation of the chromium and zinc precipitates.

32. A process according to claim 31, wherein said second pH is 8 to 10.

* * * * *